Patented Jan. 22, 1946

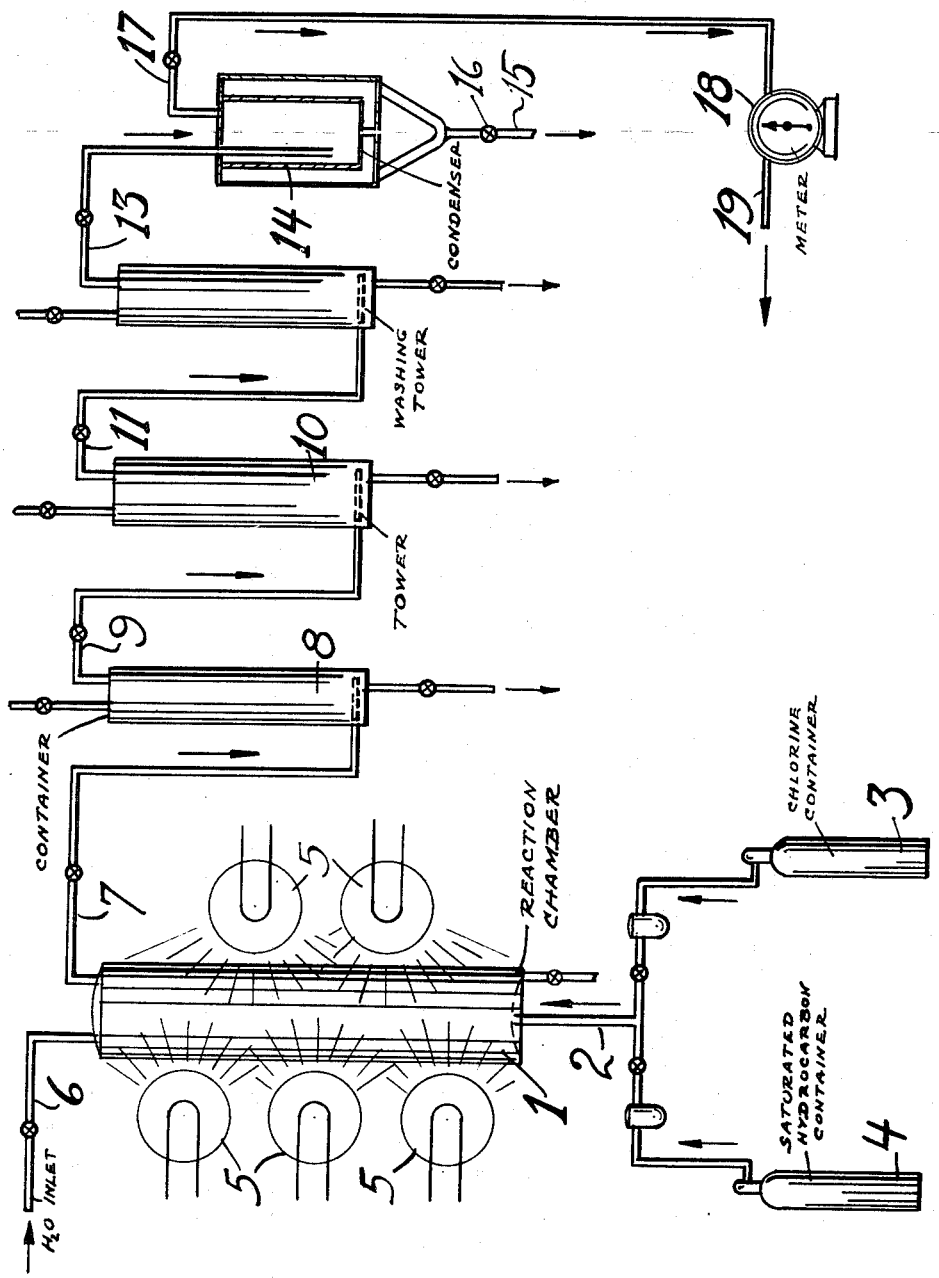

2,393,509

UNITED STATES PATENT OFFICE 2,393,509

CHLORINATION OF SATURATED HYDROCARBONS

Francis M. Archibald and Henry O. Mottern, Elizabeth, N. J., assignors to Standard Oil Development Company, a corporation of Delaware Application May 8, 1941, Serial No. 392,486

3 Claims. (Cl. 204—163)

This invention relates to improvements in the production of chlorinated aliphatic hydrocarbons, particularly in the direct chlorination of saturated hydrocarbons.

In the manufacture of halogen hydrocarbons the reaction between a saturated hydrocarbon and halogen was generally conducted under controlled conditions in a reaction zone, that is, the reaction was generally carried out at temperatures above 150° C. with the result that the products produced consisted of a complex and difficultly separable mixture containing unreacted hydrocarbons, monochlorinated hydrocarbons, poly-chlorinated hydrocarbons, and hydrogen chloride. Where temperatures of about 10° C. or lower were used, the chlorine and the hydrocarbon reacted slowly and the hydrocarbons, both unreacted and chlorinated hydrocarbons, were withdrawn, fractionated and the unreacted hydrocarbon returned to the reaction vessel until all of the hydrocarbons were reacted with chlorine. This reaction was generally carried out while exposing the contents of the reaction vessel to daylight, sunlight or any chemically active or artificial light. An objection to this process was that only small quantities of the hydrocarbon reacted with the chlorine at each time of contact.

An object of this invention is to provide a method whereby substantially all of the chlorine is reacted with the saturated hydrocarbons in one step.

This object and other objects of this invention will be more clearly understood when read with reference to the accompanying drawing in which the flow of materials is diagrammatically illustrated.

With reference to the drawing, numeral 1 denotes a reaction chamber in which is maintained a reaction liquid which aids in the chlorination of the saturated hydrocarbons. Various reaction liquids may be used, for example, glacial acetic acid, ethylene dichloride, ethylene chlorhydrin, hydrochloric acid, sulfuric acid, chloral hydrate and hydrochloric acid with added chlorhydrin. The reaction starts immediately with most of these solutions but the life of chloral hydrate for example, is limited and even though initial good chlorination is obtained as the process proceeds, the activity of the reaction liquid is steadily reduced. The prefered reaction liquid is hydrochloric acid solution of about 30% concentration.

Chlorine and the saturated hydrocarbons are supplied concurrently from containers 3 and 4, mixed and passed into the reaction vessel through pipe 2. The gas mixture is dispersed in the reaction liquid by means of passing it through porous refractory material or by other suitable mechanical means, such as a jet. The percentages of hydrocarbons and chlorine may be varied. Where ratios of hydrocarbon to chlorine of approximately 2:1 were used, 75 to 80% yields of a mono-chloride from the hydrocarbon were obtained, 90 to 95% of the chlorine being converted to chloride. When ratios less than ½:1 of the hydrocarbon to chlorine were used, the formation of the dichloride increased. The temperature at which the reaction is carried out ranges from 20° C. to 75° C.

The reaction is preferably carried out with the hydrocarbons and chlorine dispersed in the vapor phase in any of the above reaction liquids. The presence of an emulsifying agent which prevented the coalescing of the gas bubbles was indicated when the reaction liquid was in use for a time. The chlorination was rapid only when the gas dispersion was maintained in a fine state through the liquid. Sometimes there was an induction period during which the emulsifying agent was apparently being produced by some side reaction before the chlorination reached normal velocity. When hydrochloric acid solution was used, an emulsifier was formed by the reaction of the hydrocarbon and chlorine in the presence of hydrochloric acid or where olefins are present, chlorohydrins were formed which served as a very good emulsifier. The reaction is carried out in the presence of daylight, sunlight or any chemically active artificial light. Light is here provided artificially by incandescent Mazda bulbs 5, water is supplied to the reaction vessel through pipe 6 to make up for that lost in the hydrochloric acid evaporated off with the gas. The reaction products are withdrawn as gas or vapor by means of pipe 7 and washed by being passed through container 8 containing water to separate out the hydrochloric acid. In a commercial plant concentrated hydrochloric acid is recovered at this stage by condensing it. The reaction products are then carried by pipe 9 to tower 10 containing a dilute solution of alkali to remove the last traces of hydrochloric acid. The neutralized reaction products are then dried by being passed through pipe 11 and washing tower 12 containing sulfuric acid to remove the last traces of moisture. Pipe 13 carried the dried reaction product to condenser 14 containing dry ice to condense the chlorinated products which are removed through pipe 15, arranged with valve 16 to storage. The unreacted residual gases are passed through pipe 17 to meter 18 and to storage by means of pipe 19. Some di- and trichlorides are found in the product and are separated easily by fractional distillation.

When higher chlorides are formed they are allowed to accumulate in reaction tower 1 as the mono-chlorides are removed. The reaction tower may be drained intermittently, settled and the higher chlorides decanted. The temperature at which the reaction medium is held is between 40° and 50° C. The reaction medium used according to the following tables is about 30% hydrochloric acid and is close to the constant evaporating mixture under the conditions of operation. The hydrochloric strength of this percentage is stable towards chlorine. The hydrochloric acid evaporating from 30% acid at 40° C. is about 90% hydrochloric acid. It can be condensed and used as a starting point in making anhydrous hydrochloric acid. According to the tables, the rate of ethane flow was held at 90 liters per hour for continuous experiments. This rate does not represent the capacity of the apparatus used. This flow rate was found to be sufficiently high to insure the rapid removal of ethyl chloride which limits its tendency to be further chlorinated and it was sufficiently low to allow practically complete conversion of chlorine to chlorides in the reactor space. The light furnished was by means of five Mazda lamps, 300 and 500 watt. No greater intensity of light was required and even a lessening of the light would not inherently effect the rate at which the chlorides were produced.

The volume ratio of ethane to chlorine down to 1½:1 gave chlorinated products of which ethyl chloride was 90% and 90% of the chlorine fed was converted to chlorides. When the ratio is between 1.3 and 1.5:1, ethyl chloride was 85 to 86% of the total chlorides and 95 to 99% of the chlorine was converted to products. At ethane to chlorine ratios between 1:1 and 1.3:1, ethyl chloride was 85% of the chlorides while chlorine converted to the chlorides was 85%. The monochloride boiling at about 12° C. was easily separated from the dichlorides boiling at 60° C. and 84° C. by fractional distillation.

The following tables illustrate the yields obtained in following this process:

Table I

| Time, min. | Ethane feed rate liter-hr. 0°–760 mm. | Chlorine feed rate liter-hr. 0°–760 mm. | Percent ethane converted | Percent Cl$_2$ converted to chlorides | Percent Cl$_2$ converted to C$_2$H$_5$Cl | Percent C$_2$H$_5$Cl on converted ethane |
|---|---|---|---|---|---|---|
| 120 | 90 | 20.9 | 19.6 | 49.6 | 40.5 | 69.2 |
| 50 | 90 | 47.3 | 42.0 | 98.0 | 86.6 | 92.0 |
| 45 | 80 | 42.3 | 48.0 | 96.6 | 84.3 | 90.3 |
| 50 | 80 | 51.5 | 47.3 | 83.0 | 66.0 | 95.0 |
| 60 | 74 | 61.0 | 74.8 | 100.0 | 80.2 | 69.0 |
| 60 | 90 | 33.3 | 28.3 | ---- | 66.0 | 72.5 |
| 1,290 | 91 | 77.0 | 72.1 | 97.6 | 70.6 | 82.6 |

Table II

| Time, hours | Ethane feed rate liters per hr. 0°–760 mm. | Chlorine feed rate liters per hr. 0°–760 mm. | Percent ethane converted | Percent Chlorine converted to chlorides | Percent Chlorine converted to C$_2$H$_5$Cl | Percent chlorides based on converted C$_2$H$_6$ | Percent C$_2$H$_5$Cl on converted C$_2$H$_6$ |
|---|---|---|---|---|---|---|---|
| 4.25 | 91.0 | 61.0 | 58.1 | 89.7 | 76.7 | 96.0 | 87.9 |
| 17.21 | 91.0 | 57.0 | 54.5 | 90.5 | 74.0 | 94.8 | 85.2 |
| 23.25 | 91.0 | 74.0 | 67.5 | 95.1 | 71.8 | 100.3 | 86.3 |
| 21.50 | 91.0 | 77.0 | 72.1 | 97.6 | 70.6 | 96.8 | 82.6 |

We claim:
1. The process of continuously chlorinating ethane which comprises mixing ethane and chlorine in a volume ratio 1.2 to 1.5:1, dispersing said mixture in about a 30% hydrochloric acid aqueous solution maintained at a temperature from 20 to 75° C. subjecting the mixture passing through this aqueous solution to the influence of light effectively promoting the reaction, continuously withdrawing a vapor and separating the chlorinated derivatives from the vapor by condensation.

2. The process of chlorinating ethane according to claim 1 in which the light is provided artificially by incandenscent Mazda bulbs.

3. A process of chlorinating saturated aliphatic hydrocarbons according to claim 1 in which the light is provided by the sun.

FRANCIS M. ARCHIBALD.
HENRY O. MOTTERN.